(12) United States Patent
Zeidlhofer et al.

(10) Patent No.: US 9,452,559 B2
(45) Date of Patent: Sep. 27, 2016

(54) CLOSURE UNIT

(71) Applicant: ENGEL AUSTRIA GmbH, Schwertberg (AT)

(72) Inventors: Herbert Zeidlhofer, Haag (AT); Anton Lohnecker, Ertl (AT)

(73) Assignee: ENGEL AUSTRIA GMBH, Schwertberg (AT)

( * ) Notice: Subject to any disclaimer, the term of this patent is extended or adjusted under 35 U.S.C. 154(b) by 0 days.

(21) Appl. No.: 14/164,437

(22) Filed: Jan. 27, 2014

(65) Prior Publication Data
US 2014/0212531 A1 Jul. 31, 2014

(30) Foreign Application Priority Data
Jan. 28, 2013 (AU) .................... A 55/2013

(51) Int. Cl.
*B29C 45/84* (2006.01)
*B29C 45/67* (2006.01)

(52) U.S. Cl.
CPC ........... *B29C 45/84* (2013.01); *B29C 45/6728* (2013.01); *Y10T 29/49826* (2015.01)

(58) Field of Classification Search
CPC .................................................... B29C 45/84
USPC ...................... 425/153, 451.9, 595
See application file for complete search history.

(56) References Cited

U.S. PATENT DOCUMENTS

| 2,689,978 | A | * | 9/1954 | Roger | 425/451.2 |
| 3,561,063 | A | * | 2/1971 | Sindelar et al. | 425/151 |
| 4,106,885 | A | * | 8/1978 | Poncet | 425/451.2 |
| 4,304,540 | A | * | 12/1981 | Hammon | 425/150 |
| 4,318,682 | A | * | 3/1982 | Larson et al. | 425/451.9 |
| 4,453,902 | A | * | 6/1984 | Imbert | 425/47 |
| 4,504,208 | A | * | 3/1985 | Kurumaji et al. | 425/589 |
| 4,944,669 | A | * | 7/1990 | Zakich | 425/451.2 |
| 5,091,124 | A | * | 2/1992 | Zakich | 425/595 |
| 6,722,875 | B2 | * | 4/2004 | Ralph et al. | 425/595 |

FOREIGN PATENT DOCUMENTS

| AT | 12819 | 12/2012 |
| JP | 2738094 | 1/1998 |
| JP | 2926356 | 5/1999 |
| JP | 2005-28634 | 2/2005 |

OTHER PUBLICATIONS

Austrian Office Action (OA) issued Sep. 5, 2013 in Austrian Patent Application No. A 55/2013, with English translation of relevant part thereof.
Chinese Search Report issued Nov. 2, 2015 in corresponding Chinese Patent Application No. 201410129579.1.

* cited by examiner

*Primary Examiner* — James Mackey
(74) *Attorney, Agent, or Firm* — Wenderoth, Lind & Ponack L.L.P.

(57) ABSTRACT

A vertically closing closure unit for an injection molding machine includes a moveable mold mounting plate, and at least one frame bar for guiding the moveable mold mounting plate. A vertical restraint device holds and locks the moveable mold mounting plate to the at least one frame bar.

22 Claims, 4 Drawing Sheets

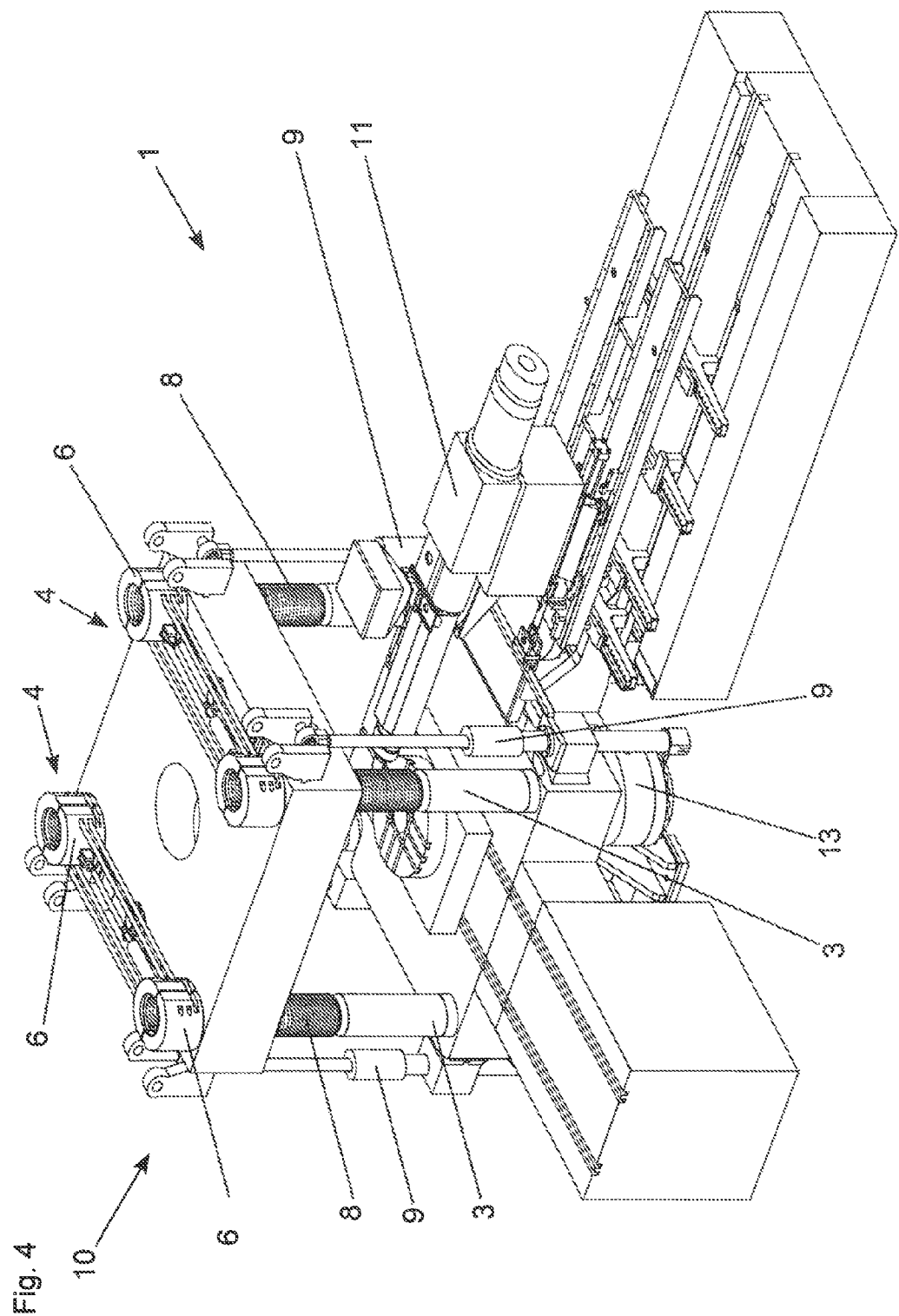

CLOSURE UNIT

BACKGROUND OF THE INVENTION

The present invention concerns a vertically closing closure unit for an injection molding machine.

For safety reasons, vertically closing closure units of injection molding machines must have restraint devices which prevent a moveable mold mounting plate from dropping down due to gravity if a defect, for example in the rapid-action mechanism, occurs. In the state of the art they are mounted to the rapid-action devices. In particular, in the case of hydraulic rapid-action devices, the restraint devices are in the form of clamping devices which if required act directly at the rapid-action cylinders. A basic problem with such restraint devices is that, in the event of structural failure of certain components of the rapid-action device or the restraint devices—for example fracture of fixing pins—the moveable mold mounting plate nonetheless drops down. This means that such components have to be over-sized to afford a certain safety cushion. Naturally that increases the production cost for such closure units.

SUMMARY OF THE INVENTION

The object of the invention is to provide a vertically closing closure unit for an injection molding machine, which is equipped with a less expensive and more reliable restraint device.

That object is achieved by the provision of a restraint device for locking the moveable mold mounting plate to the at least one frame bar. Because the frame bars in any case are of a sufficiently strong structure to hold the moveable mold mounting plate, that gives a reduction in the components which have to be constructed with a safety margin. That leads to increased security and safety and reduced production cost.

For optimum space utilization, the restraint device can be fixed to the moveable mold mounting plate.

It is preferable that locking is effected by a positively locking connection of the restraint device to at least one support surface on the at least one frame bar. Force-locking restraint devices like, for example, redundant clamping devices are on the one hand costly and on the other hand have to be regularly checked—generally once a month. That is naturally detrimental to productivity. Such disadvantages are avoided by a positively-locking locking action.

A particularly preferred embodiment is one in which the restraint device is formed by a locking mechanism which serves to lock the moveable mold mounting plate in the event of a closing pressure build-up. Due to the doubled use of the locking mechanism, that represents a particularly inexpensive structure.

That double use is particularly simple to implement if the locking mechanism is in the form of at least one—preferably divided—locking nut.

A particularly preferred embodiment is one in which in the locked condition no force working towards unlocking of the restraint device acts when the locking drive is switched off as that also ensures safety in the event of failure of the locking drive.

The positively-locking locking action can be particularly easily implemented if the at least one support surface is formed by a top side of the at least one frame bar.

However, the at least one frame bar can have an outside profile and the at least one support surface can be formed by at least one flank of the outside profile. That can provide for increased safety in particular in the case of large machines.

It can be advantageous if the at least one frame bar is of such a configuration that the restraint device is lockable to the at least one frame bar in any position of the moveable mold mounting plate, in particular that the outside profile extends so far over a length of the at least one frame bar that the restraint device is lockable to the at least one frame bar in any position of the moveable mold mounting plate. That makes the work of the operator easier for example when fitting a new injection molding tool.

The locking means according to the invention can be provided for various positions of the moveable mold mounting plate, in particular for an upper maximum position of the moveable mold mounting plate. In that respect, the upper maximum position can be defined by the maximum height of the mold mounting plate that can be reached by means of the rapid-action device.

The kind of rapid-action device or locking drive is not essential to the invention. For example, the device can be hydraulic, electric, magnetic or pneumatic. The invention also relates to an injection molding machine having a closure unit.

In addition, the invention provides a method of upwardly restraining a moveable mold mounting plate of a vertically closing closure unit to guarantee safe access to the region of the closure unit for operating personnel. That can be achieved by the restraint device according to the invention being locked, a lifting force exerted by the rapid-action device being reduced and by a signal which signals access clearance to the operating personnel being produced when the lifting force falls below a force limit value. In other words, a control unit connected to the restraint device can activate the restraint device in response to the signal, which effectively indicates a failure of the closure unit or an instruction from an operator.

In that respect, the moveable mold mounting plate can be locked in the upper maximum position or in any intermediate position.

To carry out the method, only one button on the control unit has to be actuated and the various method steps are then performed by the machine control. In that respect, however, a button can be required to remain actuated for implementation of the method by the machine control, that is to say the operator must remain with the finger on the button.

To make as much space as possible available for, for example, the operating personnel, that the moveable mold mounting plate can be moved into an upper maximum position before locking of the restraint device.

To implement a purely mechanical restraint device in machines with moveable frame bars, before the signal is produced, the at least one frame bar can be moved into a lowermost position of a calibrated stroke movement.

In regard to easy recognizability, this signal can be produced optically, preferably occurring at access doors to the closure region.

BRIEF DESCRIPTION OF THE DRAWINGS

Further advantages and details of the invention will be apparent from the Figures and the related specific description. In the Figures:

FIG. 4 shows an injection molding machine having a vertical closure unit according to the invention.

DETAILED DESCRIPTION OF THE INVENTION

Figure 1:
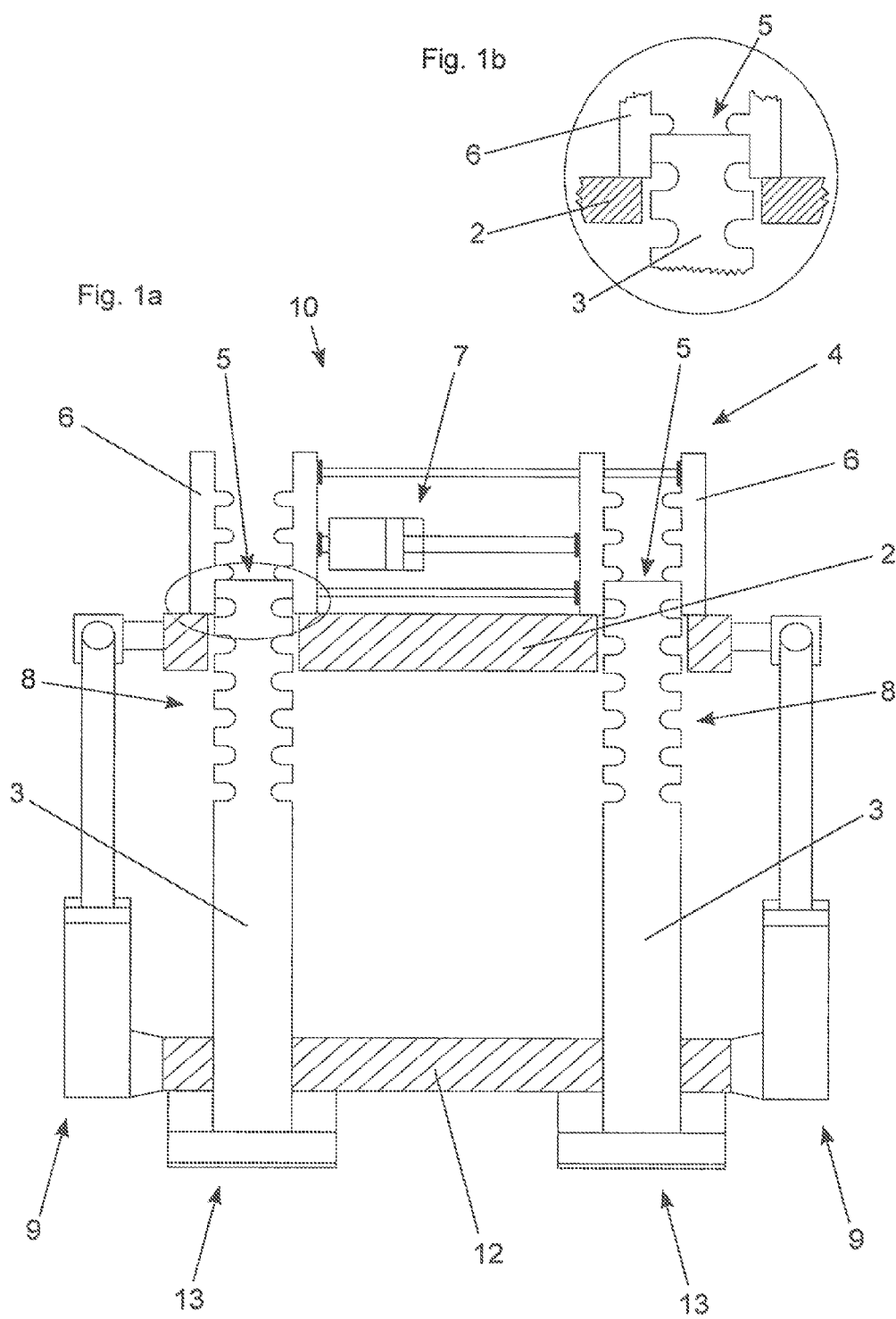
FIG. 1a shows a diagrammatic sectional view through a vertical closure unit according to the invention, which is locked in the upper maximum position.
FIG. 1b shows a detail view of the positively-locking locking situation of FIG. 1a, FIG. 2 shows a diagrammatic sectional view of a vertical closure unit according to the invention which is locked in a central position.

In the closure unit 10 diagrammatically shown in FIG. 1*a*, it is possible to see firstly the fixed mold mounting plate 12, the moveable mold mounting plate 2, the frame bars 3, the rapid-action devices 9, the pressure cushions 13, and the upward (vertical) restraint device 4. As would be clear to one skilled in the art based on the description herein, the terms "upward" and "vertical" refer to the movement of the moveable mold mounting plate 2 along and relative to the frame bars 3. In this case, the restraint device 4 comprises a respective divided locking nut 6 for each frame bar 3 and a locking drive 7 for two respective locking nuts 6. The locking drive 7 is hydraulic in the embodiment. The locking nuts 6 are fixed to the moveable mold mounting plate 2.

In this case, at least the support surface 5 is formed by the top side of the frame bars 3. This can better be seen from the detail view in FIG. 1*b* showing a flank of an inside profile of a locking nut 6 resting on the top side of a frame bar 3. This holds the moveable mold mounting plate 2 against the force of gravity in the event of failure of the locking drive as noted above so as to provide a safety feature.

In this first embodiment, the rapid-action device 9 is in the upper maximum position.

Figure 2:
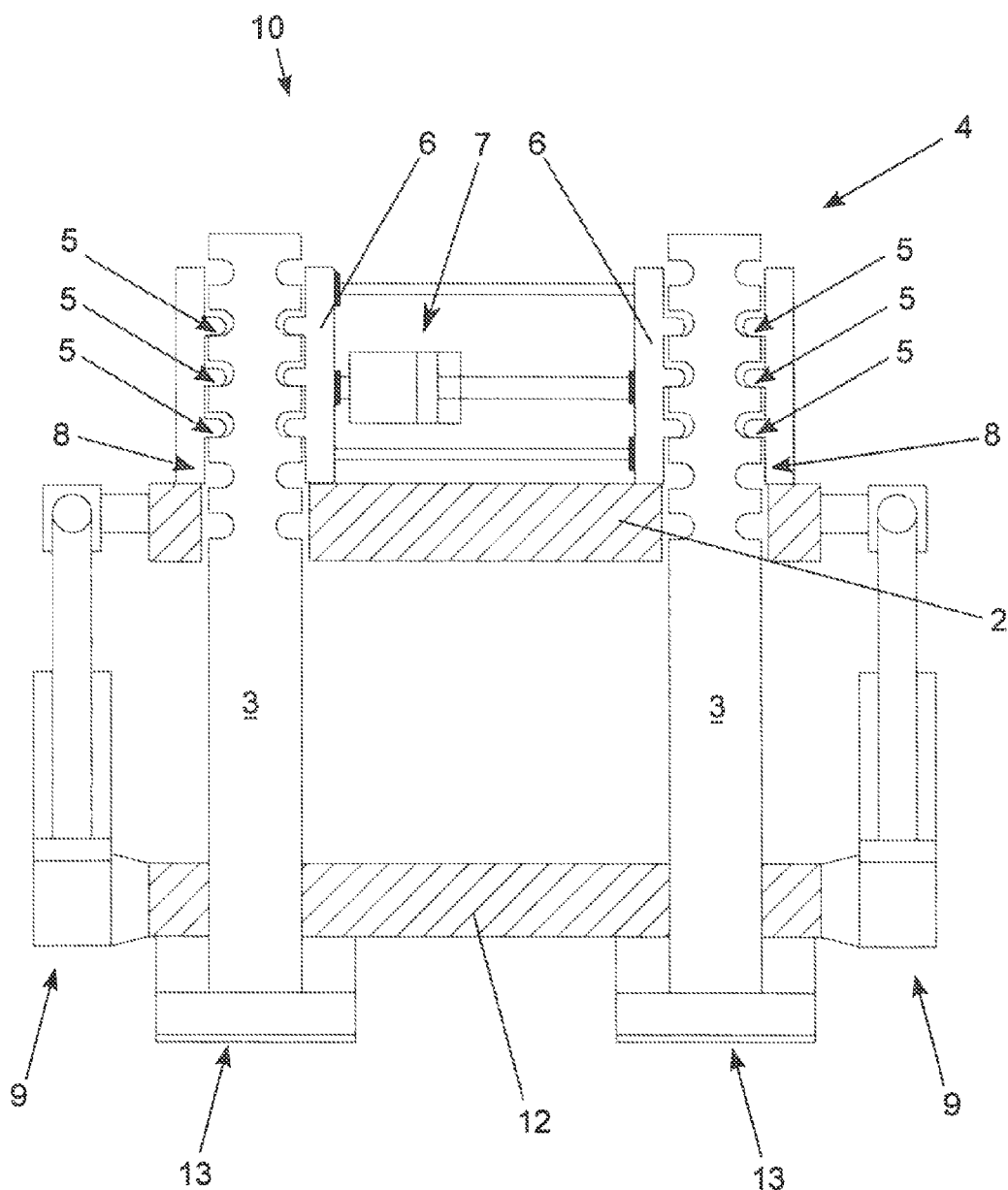

As shown in FIG. 2, the moveable mold mounting plate 2 of this embodiment can also be locked in a central position as the frame bars 3 have outer profiles 8. Two respective halves of divided locking nuts 6 are coupled in motionally connected relationship by way of linkages. In this case, the at least one support surface 5 is formed by lower flanks of the outer profile 8 of the frame bars 3. All other references correspond to those in FIG. 1 and are not further referred to hereinafter.

Figure 3:
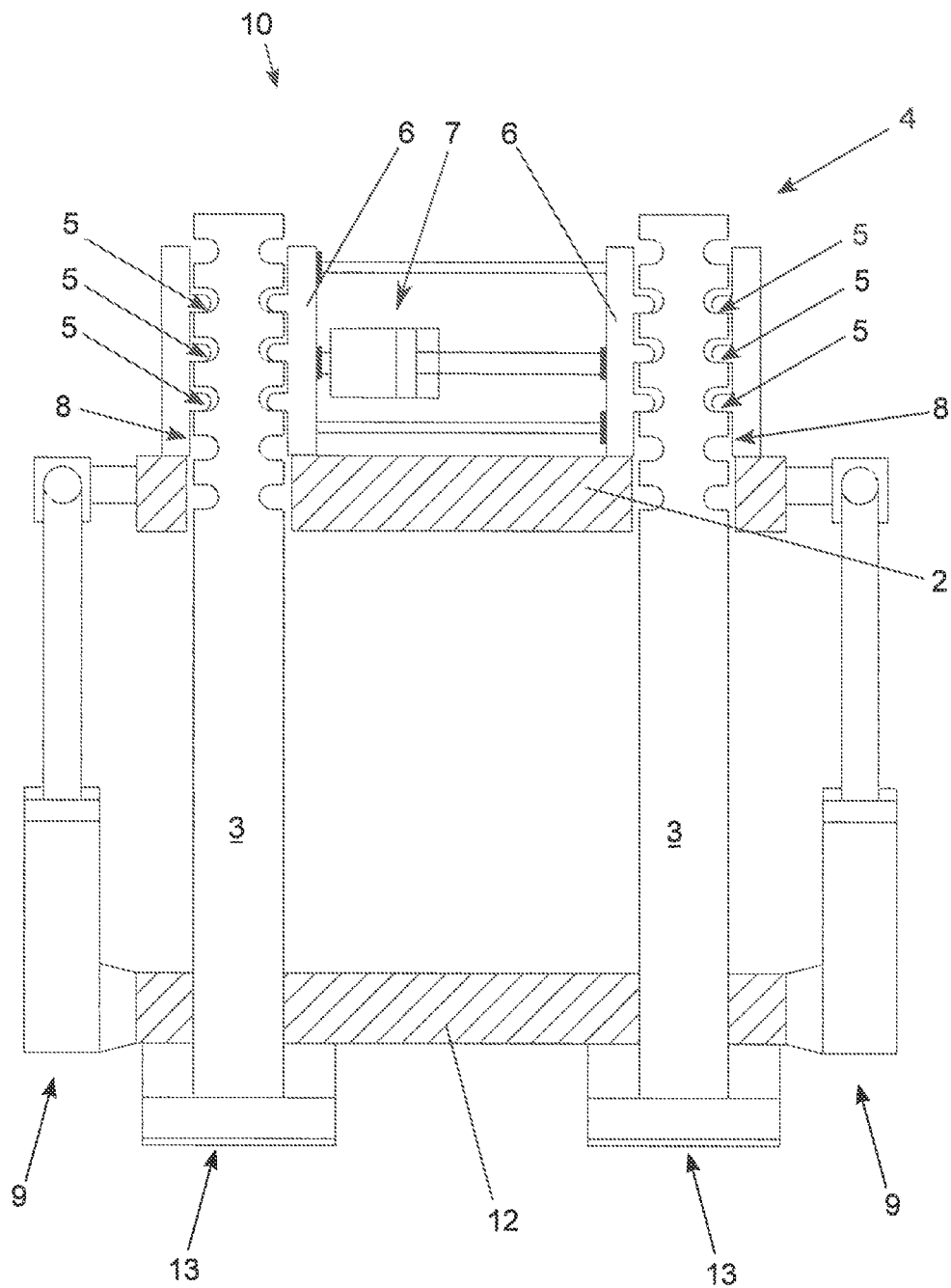
FIG. 3 shows a diagrammatic sectional view of a vertical closure unit according to the invention which is locked in an upper maximum position.

FIG. 3 shows a further embodiment in which restraint is also implemented in the upper maximum position (as shown) by engagement of the locking nuts 6 into an outer profile 8 of the frame bars 3. This embodiment represents a particularly secure but also somewhat more expensive structure as the frame bars must be longer than in the previous embodiments.

FIG. 4 shows an injection molding machine 1 having a vertical closure unit 10 according to the invention and an injection unit 11.

The present invention is not limited to the embodiments illustrated here. For example, the restraint device can also be embodied by a separate locking device—for example by a locking member in bolt form, which rests on the top side of the frame bars or engages through a through opening in the frame bars. All drives in the present embodiments are admittedly hydraulic. That however is irrelevant, and the invention can equally well be used for electric drives or any other kinds of drive.

The invention claimed is:

1. A vertically-closing closure unit of an injection molding machine, said vertically-closing closure unit comprising:
    a moveable mold mounting plate;
    a frame bar for guiding said moveable mold mounting plate;
    a vertical restraint device for locking said moveable mold mounting plate to said frame bar, said vertical restraint device comprising a locking mechanism configured to:
        hold said moveable mold mounting plate in an upper position against the force of gravity; and
        lock said moveable mold mounting plate to said frame bar at any of a plurality of positions along said frame bar during pressure build-up within the closure unit against the moveable mold mounting plate; and
    a control unit connected to said vertical restraint device and configured to activate said vertical restraint device to lock said moveable mold mounting plate to said frame bar in response to a signal indicating either a failure of said closure unit or an operating instruction from an operator.

2. The closure unit as set forth in claim 1, wherein said vertical restraint device is connected to said moveable mold mounting plate.

3. The closure unit as set forth in claim 1, wherein said vertical restraint device is configured to lock said moveable mold mounting plate to said frame bar by a positive locking connection between said vertical restraint device and a support surface of said frame bar.

4. The closure unit as set forth in claim 1, wherein said locking mechanism comprises a locking nut.

5. The closure unit as set forth in claim 4, wherein said locking nut is a divided locking nut.

6. The closure unit as set forth in claim 1, wherein said vertical restraint device comprises a locking drive for locking said moveable mold mounting plate to said frame bar.

7. The closure unit as set forth in claim 6, wherein said vertical restraint device is configured such that no unlocking force is applied to said vertical restraint device when said vertical restraint device is locking said moveable mold mounting plate to said frame bar and said locking drive is switched off.

8. The closure unit as set forth in claim 6, wherein said locking drive is hydraulic, electric, magnetic, or pneumatic.

9. The closure unit as set forth in claim 1, wherein a top side of said frame bar forms a support surface for supporting said vertical restraint device and said moveable mold mounting plate.

10. The closure unit as set forth in claim 1, wherein said frame bar has an outer profile, at least one flank of said outer profile forms a support surface for supporting said vertical restraint device and said moveable mold mounting plate.

11. The closure unit as set forth in claim 1, wherein said frame bar is a first frame bar of a pair of frame bars, said locking mechanism including:
    a pair of split nuts, each of said pair of split nuts being connected to a respective one of said pair of frame bars; and
    a locking drive configured to extend between a split portion of a first one of said split nuts and a split portion of a second one of said split nuts so as to simultaneously press against said first one of said split nuts and said second one of said split nuts so as to lock said locking mechanism.

12. The closure unit as set forth in claim 1, wherein said frame bar has an outer profile extending over a length of said frame bar such that said vertical restraint device is lockable to said frame bar in any position of said moveable mold mounting plate.

13. The closure unit as set forth in claim 1, further comprising a rapid-action device for moving said moveable mold mounting plate into a maximum upper position, said vertical restraint device being lockable when said moveable mold mounting plate is in the maximum upper position.

14. The closure unit as set forth in claim 13, wherein said rapid-action device is hydraulic, electric, magnetic, or pneumatic.

15. An injection molding machine comprising said closure unit as set forth in claim 1.

16. A vertically-closing closure unit of an injection molding machine, said vertically-closing closure unit comprising:
  a moveable mold mounting plate;
  a frame bar for guiding said moveable mold mounting plate;
  a vertical restraint device for locking said moveable mold mounting plate to said frame bar; and
  a control unit connected to said vertical restraint device and configured to activate said vertical restraint device to lock said moveable mold mounting plate to said frame bar in response to a signal indicating either a failure of said closure unit or an operating instruction from an operator;
  wherein said vertical restraint device comprises a locking drive for locking said moveable mold mounting plate to said frame bar.

17. The closure unit as set forth in claim 16, wherein said frame bar is one of a pair of frame bars for guiding said moveable mold mounting plate, said locking drive being a hydraulic locking device configured to apply pressure between said pair of frame bars so as to lock said moveable mold mounting plate to said pair of frame bars.

18. A vertically-closing closure unit of an injection molding machine, said vertically-closing closure unit comprising:
  a moveable mold mounting plate;
  a frame bar for guiding said moveable mold mounting plate; and
  a vertical restraint device for locking said moveable mold mounting plate to said frame bar;
  wherein said vertical restraint device is configured to lock said moveable mold mounting plate to said frame bar by a positive locking connection between said vertical restraint device and a support surface of said frame bar, and a top side of said frame bar forming said support surface.

19. A vertically-closing closure unit of an injection molding machine, said vertically-closing closure unit comprising:
  a moveable mold mounting plate;
  a moveable frame bar for guiding said moveable mold mounting plate;
  a vertical restraint device for locking said moveable mold mounting plate to said frame bar;
  a device for producing a signal indicating access clearance to operating personnel when a lifting force applied to said moveable mold mounting plate falls below a force limit value, said device for producing the signal being configured to produce the signal after said frame bar is moved into a lowermost position of a calibrated stroke movement.

20. The closure unit as set forth in claim 19, wherein said device for producing the signal is configured to produce the signal optically at access doors to a closure region.

21. The closure unit as set forth in claim 1, wherein said vertical restraint device is fixed to said moveable mold mounting plate for locking said moveable mold mounting plate to said frame bar.

22. The closure unit as set forth in claim 16, wherein said vertical restraint device is fixed to said moveable mold mounting plate for locking said moveable mold mounting plate to said frame bar.

* * * * *